(12) United States Patent
Wang

(10) Patent No.: US 12,049,185 B2
(45) Date of Patent: Jul. 30, 2024

(54) AIRBAG ASSEMBLY AND VEHICLE SEAT ASSEMBLY

(71) Applicant: Autoliv Development AB, Vargarda (SE)

(72) Inventor: Kan Wang, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/003,509

(22) PCT Filed: May 28, 2021

(86) PCT No.: PCT/CN2021/096989
§ 371 (c)(1),
(2) Date: Dec. 28, 2022

(87) PCT Pub. No.: WO2022/001536
PCT Pub. Date: Jan. 6, 2022

(65) Prior Publication Data
US 2023/0303024 A1 Sep. 28, 2023

(30) Foreign Application Priority Data
Jun. 30, 2020 (CN) .......................... 202021238871.4

(51) Int. Cl.
*B60R 21/207* (2006.01)
*B60R 21/231* (2011.01)
*B60R 21/2338* (2011.01)

(52) U.S. Cl.
CPC ........ *B60R 21/207* (2013.01); *B60R 21/2338* (2013.01); *B60R 2021/2074* (2013.01)

(58) Field of Classification Search
CPC ................ B60R 21/207; B60R 21/231; B60R 21/23138; B60R 21/2338;
(Continued)

(56) References Cited

U.S. PATENT DOCUMENTS 11,383,667 B1\* 7/2022 Kadam ............. B60R 21/23138
11,713,014 B1\* 8/2023 Faruque ............ B60R 21/23138
280/728.1
(Continued)

FOREIGN PATENT DOCUMENTS

CN 106255624 A 12/2016
CN 108016397 A 5/2018
(Continued)

*Primary Examiner* — Jason D Shanske
*Assistant Examiner* — Daniel M. Keck
(74) *Attorney, Agent, or Firm* — Harness, Dickey & Pierce, P.L.C.; Stephen T. Olson

(57) ABSTRACT

An airbag assembly includes: an air bag, mounted to a vehicle seat and capable of inflating from an undeployed state to a deployed state, wherein in the deployed state, the air bag extends along the head and torso of an occupant in the vehicle seat, arranged to surround the head and torso of the occupant; and a strap, for mounting the air bag to the vehicle seat and having a first section and a second section, wherein in the deployed state, the strap is tightened, the first section being mounted to the air bag on an outer surface of the air bag in an extension direction of the air bag, and the second section extending on at least one outer side surface of the air bag in a direction at an angle with respect to the extension direction of the air bag.

11 Claims, 2 Drawing Sheets

(58) Field of Classification Search
CPC ........... B60R 2021/20274; B60R 2021/23146;
B60R 2021/23161; B60R 2021/23386
USPC .......................................... 280/730.1, 730.2
See application file for complete search history.

(56) References Cited

U.S. PATENT DOCUMENTS

| | | | | |
|---|---|---|---|---|
| 2017/0036636 A1* | 2/2017 | Masuda | ................ | B60R 21/264 |
| 2020/0189510 A1* | 6/2020 | Bosio | .................... | B60R 21/233 |
| 2021/0061211 A1* | 3/2021 | Jung | ................... | B60R 21/2338 |
| 2023/0311803 A1* | 10/2023 | Jakobs | ................. | B60R 21/207 |
| | | | | 701/45 |

FOREIGN PATENT DOCUMENTS

| | | | | |
|---|---|---|---|---|
| CN | 109398288 A | | 3/2019 | |
| CN | 110871766 A | | 3/2020 | |
| CN | 213262308 U | | 5/2021 | |
| CN | 116946061 A | * | 10/2023 | ........... B60R 21/207 |
| DE | 202018004452 U1 | | 11/2018 | |
| JP | H05310095 A1 | * | 11/1993 | |
| KR | 102096933 B1 | * | 4/2020 | |
| KR | 20200097963 A | * | 8/2020 | |
| KR | 20200104031 A | * | 9/2020 | |
| WO | 2020080747 A1 | | 4/2020 | |

* cited by examiner

AIRBAG ASSEMBLY AND VEHICLE SEAT ASSEMBLY

CROSS-REFERENCE TO RELATED APPLICATIONS

The present application claims priority to Chinese patent application 202021238871.4, filed on Jun. 30, 2020 and entitled "Airbag Assembly and Vehicle Seat Assembly", which is incorporated herein by reference in its entirety.

TECHNICAL FIELD

The present application relates to the technical field of vehicles, and more particularly to an airbag assembly and a vehicle seat assembly including an airbag assembly.

BACKGROUND

A fully wrapping airbag assembly includes an air bag and a strap. When a vehicle collides, the air bag can inflate, and extend along the head and torso of an occupant, so as to be wrapped around the head and torso of the occupant in all directions (from left and right sides and the top). The strap is mounted to the air bag in an extension direction of the entire air bag, and two ends of the strap are respectively fixed to a vehicle seat. When the air bag inflates, the strap is tightened, so as to constrain the air bag.

However, lateral displacement of an air bag of such an airbag assembly is overly large when the air bag is subjected to lateral impact from an occupant, so that the occupant is prone to collide with a nearby occupant or a vehicle interior trim. As a result, it would be desirable to provide an airbag assembly in which lateral displacement of an air bag is reliably constrained, and a vehicle seat assembly.

SUMMARY

The objective of the present application is to provide an airbag assembly in which lateral displacement of an air bag is reliably constrained, and a vehicle seat assembly comprising the airbag assembly.

Provided in the present application is an airbag assembly, the airbag assembly being for a vehicle seat and comprising: an air bag, mounted to the vehicle seat and capable of inflating from an undeployed state to a deployed state, wherein in the deployed state, the air bag extends along the head and torso of an occupant in the vehicle seat, so as to surround the head and torso of the occupant; and a strap, for mounting the air bag to the vehicle seat and having a first section and a second section, wherein in the deployed state, the strap is tightened, the first section being mounted to the air bag on an outer surface of the air bag in an extension direction of the air bag, and the second section extending on at least one outer side surface of the air bag in a direction at an angle with respect to the extension direction of the air bag.

According to an embodiment of the present application, the vehicle seat has a diverting component for changing an extension direction of the strap, and the diverting component is a pulley rotatably mounted on the vehicle seat.

According to an embodiment of the present application, the vehicle seat comprises: a seat base, two side surfaces of the seat base being each provided with a first pulley; and a seat back, supported by the seat base, two side surfaces of the seat back being each provided with a second pulley, wherein two end portions of the strap are respectively connected to side surfaces of the air bag, and in the deployed state, on each side of the vehicle seat, the strap extends from the end portion of the strap sequentially around the second pulley and the first pulley.

According to an embodiment of the present application, in the deployed state, the second section located between the second pulley and the end portion of the strap extends in a direction perpendicular to the extension direction of the air bag.

According to an embodiment of the present application, the air bag has an intermediate portion in a vertical direction observed by the occupant, wherein the end portion of the strap is located at the intermediate portion.

According to an embodiment of the present application, in the deployed state, the first pulley is located in an extension direction of the first section.

According to an embodiment of the present application, in the deployed state, the air bag has a front edge spaced apart from the seat back, wherein the end portions of the strap are respectively connected to the front edge.

According to an embodiment of the present application, the first section is located at the front edge. According to an embodiment of the present application, the first section is movable in the extension direction of the air bag.

Also provided in the present application is a vehicle seat assembly, comprising: a vehicle seat; and the airbag assembly according to the above-described embodiment, the airbag assembly being mounted to the vehicle seat.

According to the embodiments of the present application, when the air bag is deployed, the tightened strap constrains the side surface of the air bag, so as to reliably constrain lateral displacement of the air bag from being overly large when the air bag is subjected to lateral impact from an occupant. Thus, lateral displacement of the occupant can be effectively suppressed, thereby preventing the occupant from colliding with a nearby occupant or a vehicle interior trim.

DETAILED DESCRIPTION

Specific embodiments of an airbag assembly and a vehicle seat assembly according to the present application will be described below with reference to the accompanying drawings. The following detailed description and the accompanying drawings are used to illustratively explain the principles of the present application. The present application is not limited to the described preferred embodiments, and the scope of protection of the present application is defined by the claims.

In the following description, positional terms "front," "rear," "upper," "lower," "left," "right," etc., are from the perspective of an occupant seated in a vehicle seat assembly. "First" and "second" are used as identifiers in this specification, and are not intended to indicate importance or order.

Figure 1:
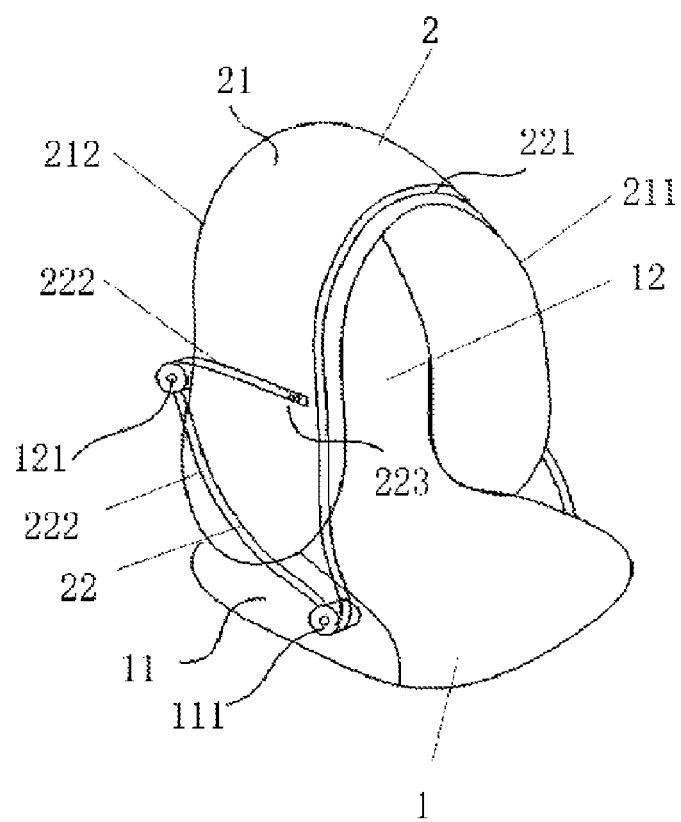
FIG. 1 shows a perspective view of a vehicle seat assembly according to an embodiment of the present application.
Figure 2:
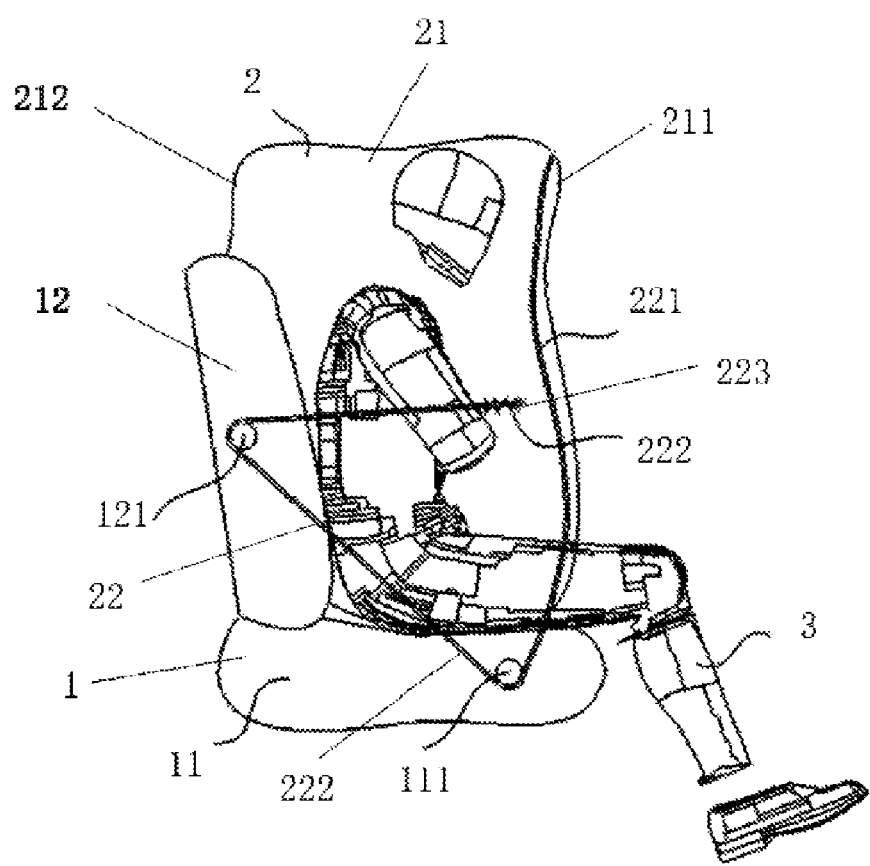
FIG. 2 shows a side view of a vehicle seat assembly according to an embodiment of the present application.

FIG. 1 shows a perspective view of a vehicle seat assembly according to the present application, and FIG. 2 shows a side view of a vehicle seat assembly according to an embodiment of the present application. As shown in FIG. 1 and FIG. 2, the vehicle seat assembly includes a vehicle seat 1 and an airbag assembly 2. The vehicle seat 1 includes a seat base 11 and a seat back 12 supported by the seat base 11. The seat back 12 can rotate relative to the seat base 11 so that the angle of the seat back 12 relative to the seat base 11 can be adjusted to allow an occupant 3 to be seated comfortably.

The airbag assembly 2 includes an air bag 21 and a strap 22. The air bag 21 can be made from any suitable material. For example, the air bag 21 can be made by weaving a polymer (for example, weaving nylon yarn). The air bag 21 is mounted to the vehicle seat 1, and is capable of inflating from an undeployed state to a deployed state. In the deployed state, the air bag 21 extends along the head and torso of the occupant 3, so as to surround the head and torso of the occupant 3. Specifically, the air bag 21 has two side portions spaced apart from each other in a left-right direction, and a top portion for connecting the two side portions to each other. In the deployed state, the top portion is curved to be substantially U-shaped or V-shaped.

The air bag 21 has a front edge 211 and a rear edge 212. The front edge 211 is spaced apart from the seat back 12, and the rear edge 212 is connected to the seat back 12. Thus, regardless of the angle of the seat back 12 relative to the seat base 11, the air bag 21 can always be wrapped around the head and torso of the occupant 3 in all directions.

For example, the strap 22 can be made of nylon webbing. The strap 22 connects the air bag 21 to the vehicle seat 1, and has a first section 221 and a second section 222. In the deployed state, the strap 22 is tightened. The first section 221 is mounted to the air bag 21 on an outer surface of the air bag 21 in an extension direction of the air bag 21, and the second section 222 extends on at least one outer side surface of the air bag 21 in a direction at an angle with respect to the extension direction of the air bag 21. In this way, when the air bag 21 is deployed, the tightened strap 22 constrains the side surface of the air bag 21, so as to reliably constrain lateral displacement of the air bag 21 from being overly large when the air bag 21 is subjected to lateral impact from the occupant. Thus, lateral displacement of the occupant can be effectively suppressed, thereby preventing the occupant from colliding with a nearby occupant or a vehicle interior trim.

The vehicle seat 1 has a diverting component for changing an extension direction of the strap 22. In an embodiment, the diverting component is a pulley rotatably mounted the vehicle seat 1, and the strap 22 extends around the pulley. By providing the pulley, resistance, to which the strap 22 is subjected during tightening, is reduced, so that when the air bag 21 inflates, the strap 22 is tightened smoothly.

Two side surfaces of the seat base 11 are each provided with a first pulley 111, and the first pulley 111 can be rotatably mounted to the seat base 11. Two side surfaces of the seat back 12 are each provided with a second pulley 121, and the second pulley 121 can be rotatably mounted to the seat back 12. Two end portions 223 of the strap 22 are respectively connected to side surfaces of the air bag 21. For example, the end portion 223 of the strap 22 is connected to the air bag 21 by means of stitches, a rivet, a bolt, an adhesive, etc. When the air bag 21 is in the deployed state, on each side of the vehicle seat 1, the strap 22 extends from the end portion thereof sequentially around the second pulley 121 and the first pulley 111. In this case, on each side of the vehicle seat 1, the strap 22 has two second sections 222 to constrain lateral displacement of the air bag 21. Such an embodiment is suitable for a case where leftward and rightward displacement of the air bag 21 need to be constrained from being overly large. In an embodiment, the airbag assembly 2 has the same configurations on left and right sides of the vehicle seat 1.

In an alternative embodiment, the left side (or the right side) of the seat base 11 has the first pulley 111, and the left side (or the right side) of the seat base 11 has the second pulley 121. One end portion 223 of the strap 22 is connected to the left side of the air bag 21. On the left side (or the right side) of the vehicle seat 1, the strap 22 extends from the end portion 223 sequentially around the second pulley 121 and the first pulley 111. On the right side (or the left side) of the vehicle seat 1, the other end portion 223 of the strap 22 is connected to the seat base 11. In this case, on the left side (or the right side) of the vehicle seat 1, the strap 22 has two second sections 222 to constrain lateral displacement of the air bag 21. Such an embodiment is suitable for a case where only leftward (or rightward) displacement of the air bag 21 needs to be constrained from being overly large.

When the air bag 21 is in the deployed state, the second section 222 located between the end portion 223 of the strap 22 and the second pulley 121 extends in a direction at an angle with respect to the extension direction of the air bag 21. For example, an extension direction of the second section 222 and the extension direction of the air bag 21 are perpendicular to each other. The air bag 21 has an intermediate portion in a vertical direction observed by the occupant 3, and the end portion 223 of the strap 22 is substantially located at the intermediate portion.

When the air bag 21 is in the deployed state, the first pulley 111 is located in an extension direction of the first section 221 of the strap 22. The two end portions 223 of the strap 22 may be respectively connected to positions in proximity to the front edge 211 of the air bag 21.

In an embodiment, the first section 221 of the strap 22 is movable in the extension direction of the air bag 21. In this way, resistance, to which the strap 22 is subjected during tightening, is reduced, so that when the air bag 21 inflates, the strap 22 is tightened smoothly. In an alternative embodiment, the first section 221 of the strap 22 can be fixedly connected to the air bag 21. For example, the first section 221 is sewn on the air bag 21 along the periphery thereof.

Further, the first section 221 is substantially located at the front edge 211 of the air bag 21. The air bag 21 is provided with an accommodation cavity extending in the extension direction of the air bag 21. The strap 22 can pass through the accommodation cavity, and can move freely in the accommodation cavity. In an embodiment, a strip-shaped fabric is sewn on the outer surface of the air bag 21, so as to form the accommodation cavity defined between the strip-shaped fabric and the outer surface of the air bag 21.

As described above, although the exemplary embodiments of the present application have been described with reference to the accompanying drawings in the description, the present application is not limited to the aforementioned specific embodiments, and the scope of protection of the present application should be defined by the claims and equivalent meanings thereof.

The invention claimed is:

1. An airbag assembly for a vehicle seat, the airbag assembly comprising:
   an air bag mountable to the vehicle seat and capable of inflating from an undeployed state to a deployed state; and
   a strap for mounting the air bag to the vehicle seat, the strap having a first section and a second section, wherein in the deployed state, the strap is tightened, the first section being mounted to the air bag on an outer surface of the air bag in an extension direction of the air bag, and the second section extending on at least one outer side surface of the air bag in a direction at an angle with respect to the extension direction of the air bag, a diverting arrangement for changing an extension direction of the strap, the diverting arrangement including a pair of first pulleys mountable to side surfaces of a seat base of the vehicle seat and a pair of second pulleys mountable to side surfaces of a seat back of the vehicle seat, wherein two end portions of the strap are respectively connected to side surfaces of the air bag, and in the deployed state, on each side of the vehicle seat, the strap extends from the end portion of the strap sequentially around a respective second pulley and a respective first pulley.

2. The airbag assembly according to claim 1, wherein in the deployed state, the second section located between each second pulley and the end portion of the strap extends in a direction perpendicular to the extension direction of the air bag.

3. The airbag assembly according to claim 2, wherein:
the air bag has an intermediate portion in a vertical direction, and
the end portion of the strap is located at the intermediate portion.

4. The airbag assembly according to claim 3, wherein in the deployed state, the first pulley is located in an extension direction of the first section.

5. The airbag assembly according to claim 4, wherein in the deployed state, the air bag has a front edge spaced apart from the seat back.

6. The airbag assembly according to claim 5, wherein the first section is located at the front edge.

7. The airbag assembly according to claim 1, wherein the first section is movable in the extension direction of the air bag.

8. The airbag assembly for a vehicle seat of claim 1 in combination with the vehicle seat, the airbag assembly mounted to the vehicle seat.

9. The airbag assembly according to claim 1, wherein in the deployed state, the air bag is configured to extend along a head and a torso of an occupant in the vehicle seat, so as to surround the head and torso of the occupant.

10. An airbag assembly in combination with a vehicle seat comprising:
an air bag mounted to the vehicle seat and capable of inflating from an undeployed state to a deployed state, wherein in the deployed state, the air bag extends along the head and torso of an occupant in the vehicle seat, so as to surround a head and a torso of the occupant; and a strap mounting the air bag to the vehicle seat and having a first section and a second section, wherein in the deployed state, the strap is tightened, the first section being mounted to the air bag on an outer surface of the air bag in an extension direction of the air bag, and the second section extending on at least one outer side surface of the air bag in a direction at an angle with respect to the extension direction of the air bag, a diverting arrangement for changing an extension direction of the strap, the diverting arrangement including a pair of first pulleys mounted to first and second side surfaces of a seat base of the vehicle seat, respectively and a pair of second pulleys mounted to first and second side surfaces of a seat back of the vehicle seat, respectively, wherein two end portions of the strap are respectively connected to side surfaces of the air bag, and in the deployed state, on each side of the vehicle seat, the strap extends from the end portion of the strap sequentially around a respective second pulley and a respective first pulley.

11. An airbag assembly for a vehicle seat, the airbag assembly comprising:
an air bag mountable to the vehicle seat and capable of inflating from an undeployed state to a deployed state; and a strap, for mounting the air bag to the vehicle seat and having a first section and a second section, wherein in the deployed state, the strap is tightened, the first section being mounted to the air bag on an outer surface of the air bag in an extension direction of the air bag, and the second section extending on at least one outer side surface of the air bag in a direction at an angle with respect to the extension direction of the air bag, a diverting arrangement for changing an extension direction of the strap, the diverting arrangement including a first pulley mountable to a first side surface of a seat base of the vehicle seat and a second pulley mountable to a first side surface of a seat back of the vehicle seat wherein the diverting arrangement further includes a further first pulley mountable to a second side surface of the seat base of the vehicle seat and a further second pulley mountable to a second side surfaces of the seat back of the vehicle seat.

* * * * *